May 12, 1970 F. F. LEE ET AL 3,511,929

METHOD OF AND APPARATUS FOR PICTURE STORAGE AND DISPLAY EMPLOYING TIME MULTIPLEXING AND RECORDING IN MULTIPLE CHANNELS

Filed Feb. 11, 1966 4 Sheets-Sheet 1

INVENTORS
FRANCIS F. LEE
DONALD E. TROXEL

BY Rines and Rines

ATTORNEYS

INVENTORS
FRANCIS F. LEE
DONALD E. TROXEL

BY Rines and Rines

ATTORNEYS

INVENTORS
FRANCIS F. LEE
DONALD E. TROXEL

BY Rines and Rines

ATTORNEYS

May 12, 1970 F. F. LEE ET AL 3,511,929

METHOD OF AND APPARATUS FOR PICTURE STORAGE AND DISPLAY EMPLOYING TIME MULTIPLEXING AND RECORDING IN MULTIPLE CHANNELS

Filed Feb. 11, 1966 4 Sheets-Sheet 4

INVENTORS
FRANCIS F. LEE
DONALD E. TROXEL

BY Rines and Rines

ATTORNEYS

United States Patent Office 3,511,929
Patented May 12, 1970

3,511,929

METHOD OF AND APPARATUS FOR PICTURE STORAGE AND DISPLAY EMPLOYING TIME MULTIPLEXING AND RECORDING IN MULTIPLE CHANNELS

Francis F. Lee, 35 Highland Ave., Lexington, Mass. 02173, and Donald E. Troxel, 21 Hall Ave., Watertown, Mass. 02172

Filed Feb. 11, 1966, Ser. No. 526,852
Int. Cl. H04n 5/78; H04j; G11b 5/02
U.S. Cl. 178—6.6 4 Claims

ABSTRACT OF THE DISCLOSURE

The present invention relates to the video recording and playback of single video frames. The video signal is converted from analog to digital format. Subsequently the digital signal is time multiplexed and recorded on plural tracks. The time multiplexing is accomplished by an electronic commutator which gates the digital signal to the appropriate recording channel. The inverse process is utilized for reproduction.

The present invention relates to methods of and apparatus for picture storage and display, being more particularly directed to the storage and display of single video frames and the like.

Cathode-ray-tube displays have long been used as electronic computer and other similar system output devices for the presentation of alpha-numeric and graphical information. The phosphors of conventional cathode-ray tubes, however, are of limited persistence, such that any display must be refreshed periodically to make it flicker-free. The need for periodic refreshing can be substantially reduced if a direct-viewing storage tube is employed; but the cost of direct-viewing storage tubes of suitable resolution and size is too high for many desired storage and display usages.

Resort has therefore been had either to repeated presentation of the display information by the computer or similar equipment, or to the employment of a separate display storage and control unit which periodically displays the stored information to give a flicker-free presentation with a minimum expenditure of computer time.

Since, moreover, the number of bits of storage required for an arbitrary two-level (black and white) picture with a resolution comparable to that of the Standard American Broadcast Television quality is approximately 250,000, and this amount of storage is currently not available economically in existing display systems, the type of information which can be presented is restricted in nature. Present computer and similar display systems and information retrieval systems thus must unfortunately limit the display to pictures which are composed of a limited number of alphanumeric and special symbols.

An object of the present invention, therefore, is to provide a new and improved method of and apparatus for video storage and display that shall not be subject to any of the above-described disadvantages or restrictions but that, to the contrary, provides for unrestricted picture storage and display.

A further object is to provide such a novel apparatus utilizing rotating magnetic storage media as the display storage element for such unrestricted pictures.

Still another object is to provide a novel storage and display system of more general utility, also.

Other and further objects will be explained hereinafter and are more particularly delineated in the appended claims. In summary, however, the ends of the invention are accomplished by the application of, for example, a binary signal transition multiplexing technique to saturation magnetic recording and subsequent recovery of binary signals which exceed the resolving capability of any individual recording channel. Conventional recording techniques would require that the recording playback head and recording medium be capable of resolving the shortest separation between successive signal transitions. In contrast, however, the present invention uses a novel multiplexing technique which causes successive signal transitions to be recorded on successive channels of a plurality of N recording channels; the value of N being determined by the ratio of the minimum resolvable interval of a recording channel to the minimum interval between successive signal transitions of the binary signal to be recorded. If it is desired to record an analog video signal, standard analog-to-digital conversion techniques can be used in accordance with the invention to digitize the video signal to give P parallel two-level signals, where $2^P$ is not less than the number of amplitude levels of the analog video signal which it is desired to record and/or display.

The invention will now be described in connection with the accompanying drawing, FIG. 1 of which is a block diagram of a preferred embodiment;

Figure 1:
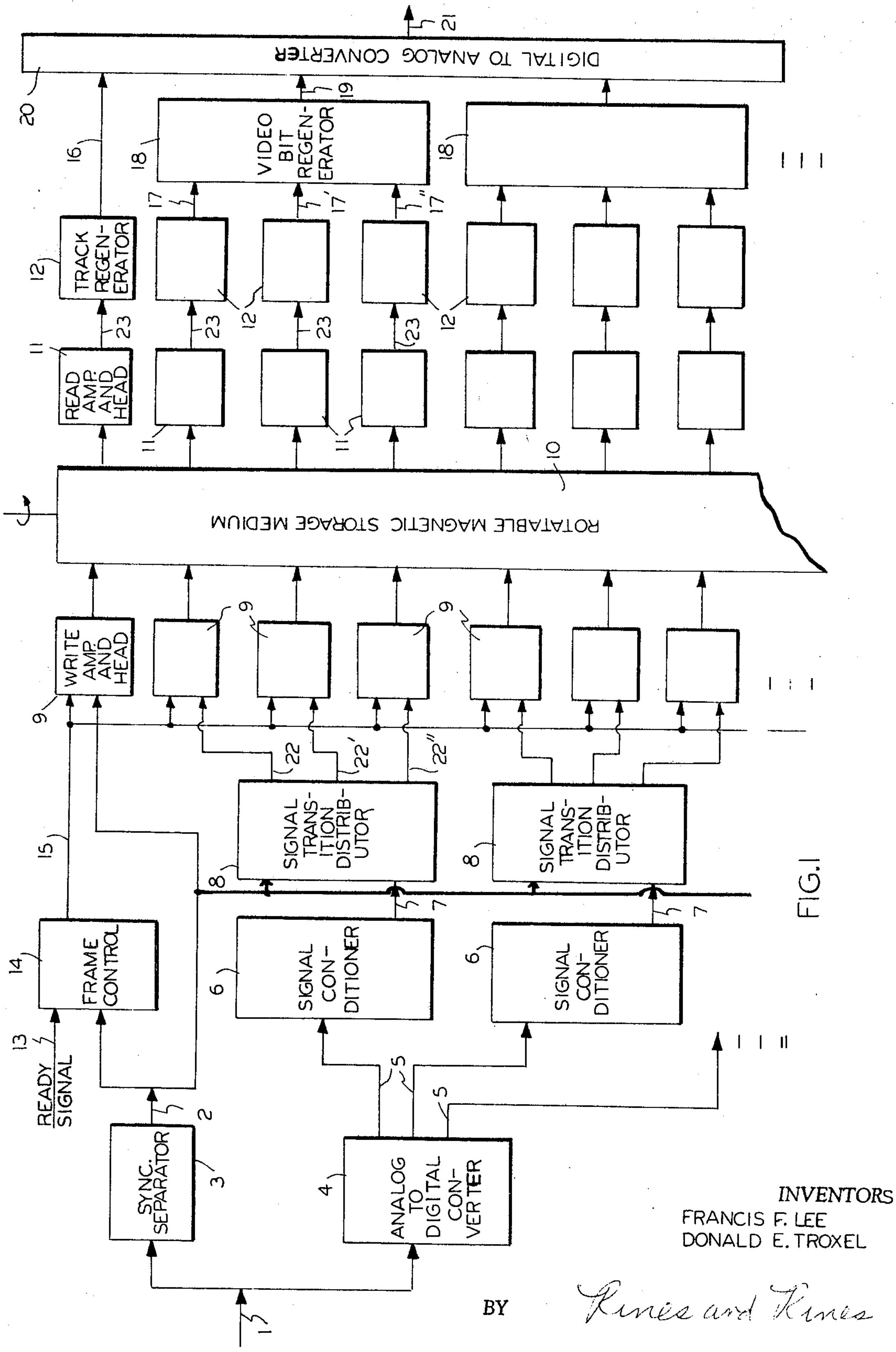
Figure 3:
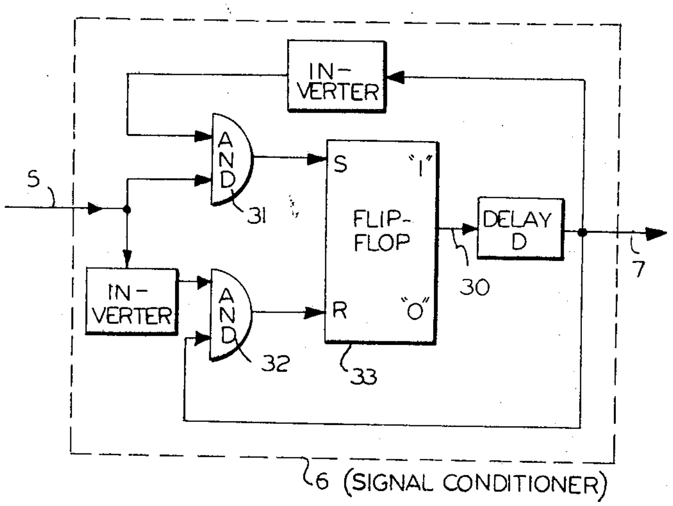
FIG. 3 is a block diagram of a suitable signal conditioner for the system of FIG. 1.

The multiplexing technique of the invention as applied to the system shown in FIG. 1 is capable of storing and regenerating signals necessary for the display of single frame two-dimensional pictures. The input signal received at 1 is a composite video signal which can be obtained from the video detector of a television receiver, or directly from a television camera, or from a microfilm scanner, or from a scan conversion device, or similar source. The synchronizing signal 2 is separated in conventional fashion from the composite video signal at 1 by the synchronization separator 3, such as, for example, of the comparator type Fairchild Model MA710; and the video portion of the composite video signal is converted into digital form by an analog-to-digital converter 4, such as the type described hereinafter, or any other suitable type. Each of the outputs from the converter 4, namely, the video bit signals at 5, is processed by a signal conditioner 6, as of the type later described in connection with FIG. 3. This processing ensures that successive positive and negative transitions of each of the conditioned video bit signals at 7 are separated by no less than a time interval corresponding to the desired resolution.

As the minimum interval between successive signal transitions in each conditioned video bit signal at 7 can be substantially shorter than the minimum resolvable interval of a recording channel later described, a signal transition distributor 8 (such as that hereinafter described in connection with FIGS. 4 and 4A), causes successive signal transitions to be distributed to a plurality of video recording channels or tracks, as represented by a plurality of write amplifiers 9 cooperating with corresponding recording heads alined with successive laterally spaced recording or storage channels or tracks of, for example, a rotating magnetic storage drum or disc or other medium 10. The original train of signals comprising successive positive and negative transitions defining successive bits of the picture information, is divided up at outputs 22 of the signal-transition distributor 8, as later explained, into a plurality of interlaced groups of spaced signal bits to multiplex the signal train. Read amplifiers 11 are provided, cooperative with their corresponding reproducing heads, schematically illustrated by the input arrows to their left and each alined with a corresponding channel of the medium 10, to reproduce the said groups of spaced signal bits repetitively upon each revolution of the drum 10, following the storage. Through later-described respective track and video bit regenerators 12 and 18, recombination is effected repetitively to reproduce the original signal train.

Upon receipt of a ready signal at 13 in the input of the later-described frame control 14, the beginning and the end of the next frame are detected, providing a write control signal at 15 which enables the recording of a frame of composite video in one revolution of the magnetic storage medium 10. The synchronizing signal at 2 is used to preset the signal transition distributor 8 to a standard condition at the beginning of each horizontal sweep, the synchronizing signal being passed directly to the uppermost recording channel in this embodiment.

The reproduced stored or recorded information is amplified by the read amplifiers and heads 11. The output of the uppermost track regenerator 12, corresponding to the synchronizing channel, constitutes the regenerated synchronizing signal at 16 which is a duplicate of the originally recorded synchronizing signal at 2. The outputs at 17, 17′, etc., corresponding to the video bit signal recording channels, are fed into respective video bit regenerators 18 which produce the regenerated or recombined video bit signals at 19, these being duplicates or reproductions of the originally recorded conditioned video bit signals at 7. The regenerated synchronizing signal at 16 and the regenerated video bit signals at 19 are combined by a digital-to-analog converter 20, such as the Adage Model VT–7, to reproduce, repetitively as the drum 10 rotates following storage, successive ultimate output composite video or picture signals at 21.

The function of the analog-to-digital converter 4 can be satisfied by a unit such as the Raytheon Model AD–50A, or a collection of voltage comparators similar to the before-mentioned synchronization separator 3, with reference voltages set at suitable levels. In the latter case, a coding may be used to reduce the number of video bit signals at 5, as is well known.

The successive video bit signal transitions may be separated by time durations smaller than that necessary to achieve the desired resolution. Thus it is necessary to condition the video bit signal at 5 to ensure that excessive demands are not made upon the resolving capability of the system. This function is accomplished by the signal conditioner circuit 6, as of the type detailed in FIG. 3. Assuming the input signal at 5 to the signal conditioner 6 is at "0" level, the output at 30 of a main flip-flop 33 and the resulting conditioned video bit signal at 7 are also at "0" level, and no signal transition is propagating in the delay element D connected to the "1" output of the flip-flop 33. Since only one input to the two-input "and" circuit 31 is "1," the output of "and" circuit 31 is "0." Similarly, the output of the further "and" circuit 32 connected to 5 through an inverter, so-labelled, is "0." The flip-flop 33 is thus left in the reset state with output signal "0" at 30. The signal conditioner 6 is then at a stable state. Likewise, a stable state exists with both input signal at 5 and output signal at 30 at the "1" level. When, however, the input signal at 5 changes from a "0" level to a "1" level, "and" circuit 31 produces a set signal which sets flip-flop 33 at S, making the output signal at 30 a "1" level. At time D later, the signal at 7 also changes to "1" level, disabling "and" circuit 31. If the input signal at 5 now becomes "0," a reset signal will be generated by "and" circuit 32 to reset flip-flop 33 at R.

Figures 3A, 3B, 3C, 3D:
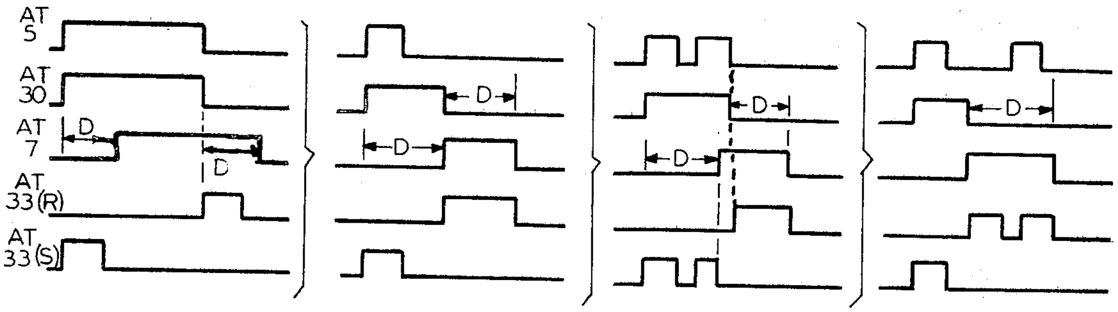
FIGS. 3A through 3D are explanatory labellel waveforms of the operation of signals at the various portions of the circuit of FIG. 3.

Signal waveforms corresponding to input changing at intervals greater than D are shown in FIG. 3A. The time interval D shown in FIGS. 3A through 3D is intended to be the same. If the input signal at 5 has two transitions separated by less than D apart, as shown in FIG. 3B, the "and" circuit 32 reset signal is not generated until time D after the first transition of the input signal at 5. At time 2D after the first transition, all signals return to the state before the first transition, and the signal conditioner 6 is ready to respond to further input changes. The response of the signal conditioner 6 to a burst of input signal transitions less than D apart is shown in FIGS. 3C and 3D. In general, the output signal at 30 follows the input signal at 5, except that after each output state change, the output signal at 30 stays unchanged for a duration D, and any input change during this interval D is ignored.

Figure 4:
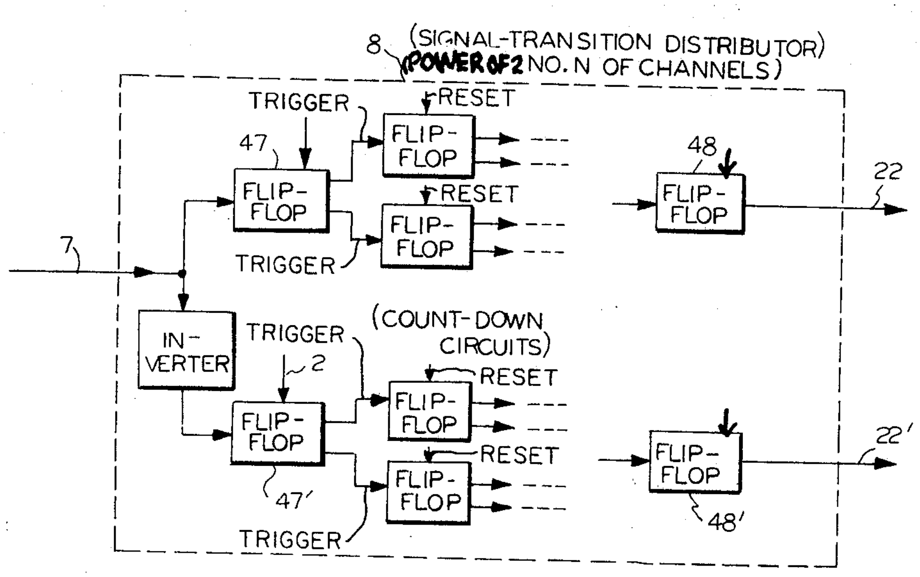
FIGS. 4 and 4A are diagrams of preferred signal-transition distributors.
Figure 4A:
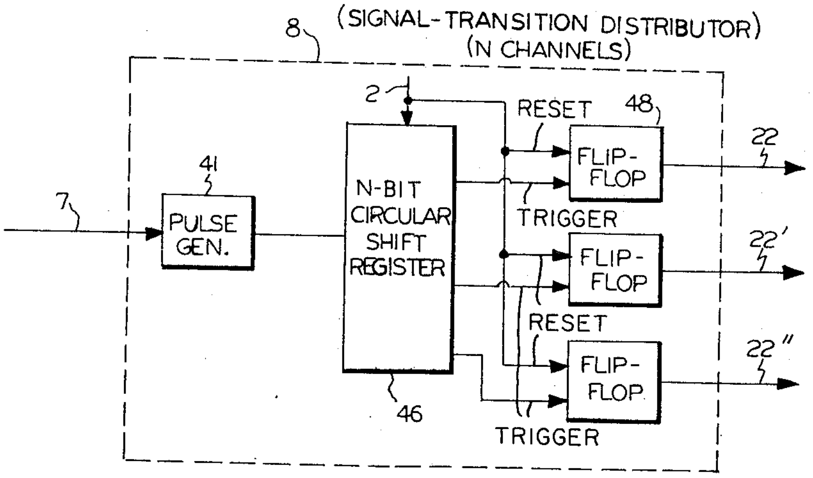

A preferred signal transition distributor 8 is shown in FIGS. 4 and 4A. It distributes successive transitions of each conditioned video bit signal at 7 into N channels so that the minimum transition separation of each channel is at least N times longer than the minimum transition separation of each conditioned video bit signal at 7. N, the number of channels required, must not be less than the ratio of the minimum resolvable time interval of the storage medium 10 to the minimum time interval of the conditioned video bit signal at 7.

When N is chosen to be an integer power of 2, the signal transition distributor may assume the form shown in FIG. 4, embodying flip-flops 47 and 47′, respectively, connected to the conditioned video bit signal output at 7 directly and through an inverter, so-labelled; and, in turn, provided with binary flip-flop trees terminating at 48 and 48′. All flip-flops shown are reset at the beginning of each horizontal sweep by the synchronizing signal at 2, the top inputs being the reset lines and the center inputs, the trigger lines. The normal and inverted conditioned video bit signals at 7 are thus provided as inputs to the binary tree of flip-flops 47 of which the last rank consists of N flip-flops 48, which also serve as the distributor output flip-flops. Each output side of a flip-flop is connected to the complementing input of one and only one flip-flop in the following rank. In this manner, the transitions of conditioned video bit signal at 7 are distributed to successive output flip-flops 48, 48′, etc., whose outputs at 22, 22′, etc., drive corresponding write or record amplifiers and heads 9.

An alternate signal transition distributor for any N is shown in FIG. 4A. It consists of a pulse generator 41, an N bit circular shift register 46 (such as a shift register of the Fairchild 916 JK flip flop type, used as a circular shift register by connecting the output to its input), and the output flip-flops 48. At the beginning of each horizontal line of video signal, the synchronizing signal at 2 resets the output flip-flops 48 and presets the register 46 to a standard condition in which all bits are zero except for the first bit. Pulse generator 41 provides a shift pulse to the circular shift register 46 for each transition of the conditioned video bit signal 7. Each bit of register 46 is connected to the complementing input of a different output flip-flop 48, the upper inputs being the reset lines and the lower inputs, the trigger lines.

Figure 4B:
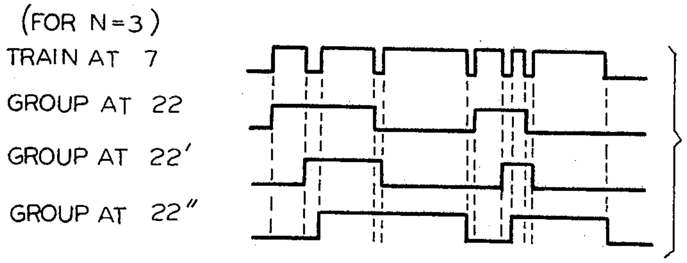
FIG. 4B is an explanatory waveform diagram illustrating a mode of operation of the distributor of FIG. 4A.

The input and output waveforms for such a signal transition distributor are shown in FIG. 4B for the case when the number of channels, N, is three; the interlaced or multiplexed groups of spaced signal bits being shown at 22, 22′ and 22″, divided from the original successive signal train at 7.

Figure 2:
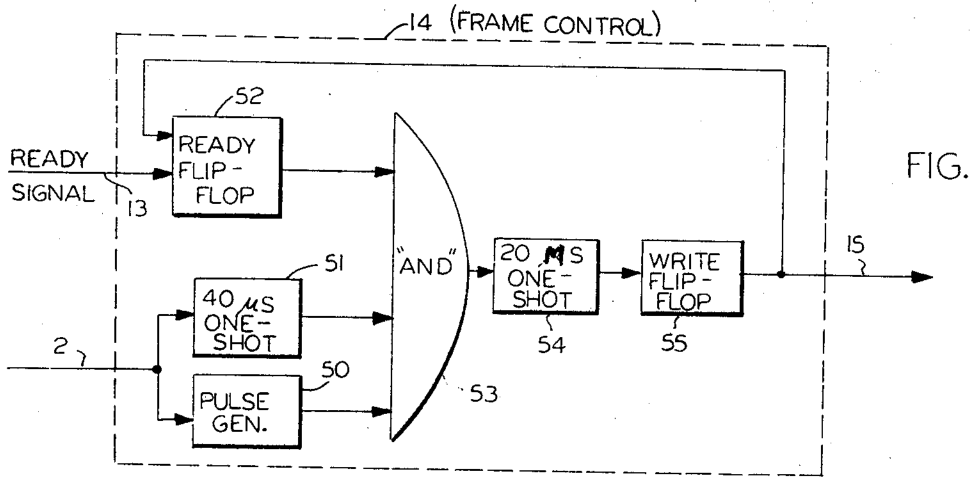
FIG. 2 is a block diagram of a preferred frame control circuit for use in the system of FIG. 1.

The frame control circuit 14 may be of the type illustrated in FIG. 2, providing a write control signal at 15 which acts as a gate signal to the write or record amplifiers 9. The write control signal at 15 enables or renders effective the amplifiers 9 at the beginning of a frame of video signal and disables them or renders them ineffective at the corresponding point at the end of the frame. The frame control circuit 14 is responsive to the synchronizing signal at 2 which has a particular well-known format in a standard television signal. The particular design of FIG. 2 is adapted to operate with the American standard; but the same principles may be employed with other systems with a slight modification of the circuit of FIG. 2. The ready flip-flop 52 is set by the presence of the ready signal at 13. A pulse generator 50 generates a pulse at the leading edge of the synchronizing signal at 2, and a 40 μs. (forty microsecond) one-shot circuit 51 (such as the type described in Fairchild Applications Notes App. 106, August 1965) is triggered by the trailing edge of the synchronizing signal at 2. "And" circuit 53, connected to each of the one-shot circuit 51, the pulse generator 50 and the ready flip-flop 52, triggers an output 20 ms. (twenty millisecond) one-shot circuit 54 when two synchronizing pulses occur within an interval of less than 40 μs. while the ready flip-flop 52 is set. This marks the beginning of the desired fields. The leading edge of the output of the 20 ms. one-shot circuit 54 complements write flip-flop 55 into the set state which enables or renders effective the write amplifiers and recording heads 9.

The synchronizing signals at 2, corresponding to the beginning of the following field, occur 16.667 milli-seconds after the signal which triggered the 20 ms. one-shot circuit 54; but since the 20 ms. one-shot circuit 54 is still in the triggered state, this input is ignored. At the beginning of the third field, however, which is also the end of the frame being recorder or stored on the drum 10, the 20 ms. one-shot circuit 54 is triggered again. The leading edge of the output of the 20 ms. one-shot circuit 54 again complements the write flip-flops 55, returning it to the reset state, disabling or rendering ineffective the write amplifiers and recording heads 9. The set-to-reset transition signal of the write flip-flop 55 resets the ready flip-flop 52, preparing it for the next ready signal at 13. Thus the write amplifiers and recording heads 9 are enabled one complete frame time following the presence of the ready signal 13.

The write amplifiers and recording heads 9, the magnetic storage medium 10, and the read or reproduction amplifiers and heads 11 may, for example, be of the type used in the Data Disc Model F–6 unit marketed by Data Disc, Inc., of Palo Alto, Calif. The read amplifiers 11 provide linear amplification of the playback signals for use by the track regenerators 12, now to be described.

Figure 5:
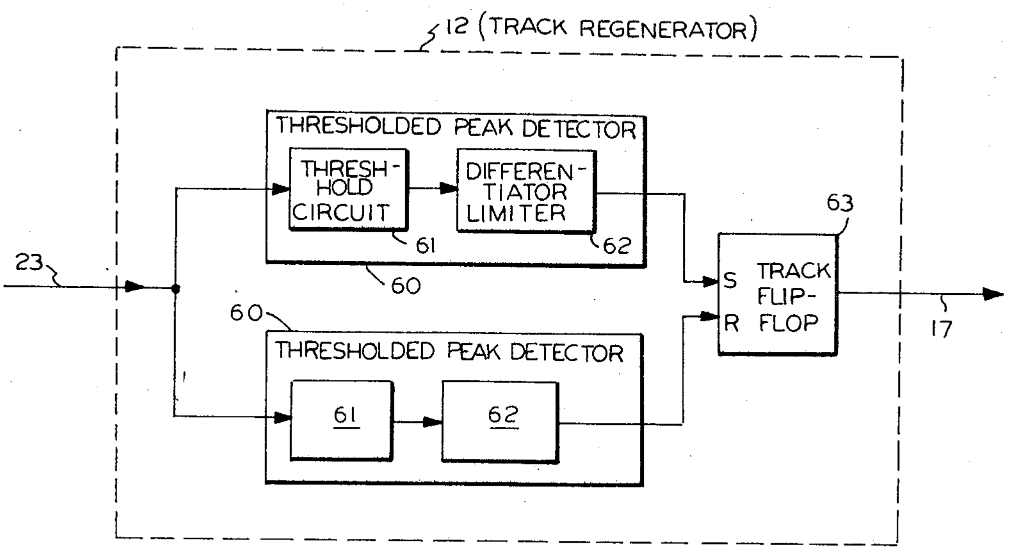
FIG. 5 is a block diagram of a preferred track regenerator circuit for use in the system of FIG. 1.

In saturation magnetic recording, as here preferred, the positive and negative peaks of the playback signal correspond to the respective polarities of the recorded signal transitions. A suitable track regenerator circuit 12 for this operation is shown in FIG. 5. A thresholded peak detector 60 consists of a threshold circuit 61 and a differentiator-limiter 62, which is a linear differentiator followed by a limiting amplifier. The purpose of the threshold circuit 61 is to reject noise which may be present at the read amplifier output at 23. The differentiator-limiter 62 provides a pulse to the set input of a track flip-flop 63 at a time corresponding to peaks of the signal at 23 which exceed the threshold of circuit 61. Similarly, another thresholded peak detector 60 provides reset pulses to track flip-flop 63 corresponding to the other polarity peaks of the read amplifier output at 23. Thus the output of the track regenerator 63 is a duplicate of the signal which was recorded on the magnetic storage medium 10. As the drum 10 repetitively rotates, following a frame storage, thus, repetitive reproduction is effected of the interlaced groups of spaced signal bits corresponding to the multiplexed original video signal train.

Figure 6:
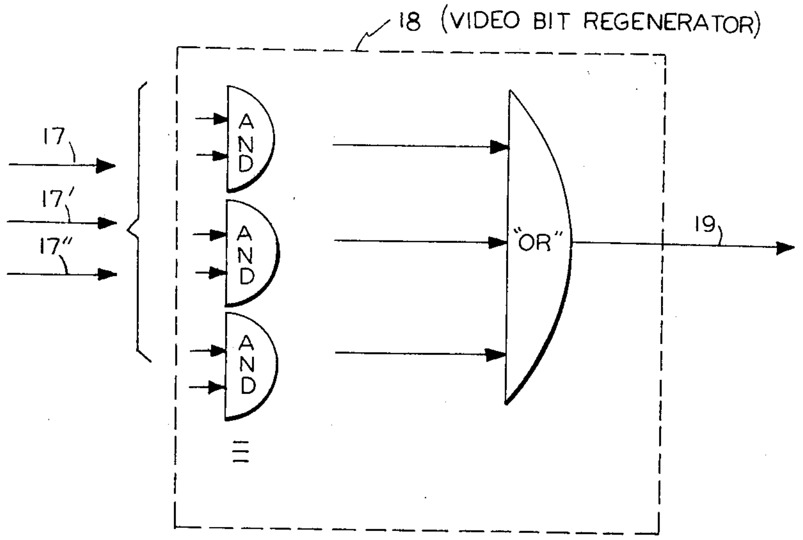
FIG. 6 is a similar diagram of a suitable video bit regenerator.

It thus only remains to describe a preferred form of the video bit regenerator 18 that reproduces the original picture train, consisting of combinatorial logic circuits which accept the track regenerator outputs 17, 17′, etc. in "and" gates (FIG. 6), connected to a common "or" gate, and produce the regenerated recombined video bit signal at 19. Labelling the inputs to the video bit regenerator 18 with $a_1, a_2 \ldots a_n$, such that $a_1$ corresponds to the channel which recorded the first signal transition from the signal transition distributor 8, $a_2$ corresponding to the second signal transition, etc., the Boolean equation for the regenerated video bit signal 19 may be shown to be $$a_1\bar{a}_2+a_3\bar{a}_4+\ldots+a_{n-1}\bar{a}_n \text{ for } n \text{ even}$$

and $$a_1\bar{a}_2+a_3\bar{a}_3+\ldots+a_{\frac{n+1}{2}}\bar{a}_{\frac{n+3}{2}}+a_1a_n+\bar{a}_2a_3+\bar{a}_4a_5+\ldots+\bar{a}_{n-1}a_n$$

for $n$ odd.

Successful operation has been attained with a working model of the invention of FIG. 1, capable of the recording and subsequent displaying of an arbitrary two-level (black and white) picture, with the analog-to-digital converter 4 consisting of a single comparator and with the use of a single signal conditioner 6 and a single signal transition distributor 8. The number of recording channels N was chosen to be 3, and a Vermont Research Corporation Model 104 rotating magnetic storage medium 10 was used, each channel of this storage medium being capable of recording and reproducing a binary signal with transitions of not less than 0.6 μs. A test pattern consisting of 300 alternate black and white lines was recorded and subsequently displayed. This corresponds to a binary video signal with transitions as close as 0.2 μs. In addition single frame pictures were successfully recorded from commercial television broadcasts and also from a closed circuit television camera.

While preferred types of circuits are described above, it is clear that other circuit configurations and types of apparatus may also be employed to practice the method underlying the invention, and that further modifications will occur to those skilled in the art, all such being considered to fall within the spirit and scope of the invention as defined in the appended claims.

What is claimed is:

1. Apparatus for storing and displaying pictures and the like, that comprises, means for receiving a train of signals and the like comprising successive positive and negative transitions defining successive bits of the picture information, a signal storage medium having a plurality of storage channels successively laterally displaced along the medium, means connected with the receiving means for dividing the signal train into a plurality of interlaced groups of spaced signal bits to multiplex the signal train, means for storing each group of spaced signal bits on a corresponding storage channel of the said medium, means for repetitively reproducing the successive groups of signal bits stored on each successive storage channel and for recombining the same repetitively to reproduce a train corresponding to the first-named train of signals, means for displaying the repetitively reproduced recombined train of signals, the dividing means comprising analog-to-digital converter means connected with a plurality of signal-transition distribution means and the storing means comprising a plurality of normally ineffective recording means connected with the distributor means and each corresponding to one of the storage channels for recording signals thereon, frame control means for selecting a desired frame of picture signals and for thereupon rendering the recording means effective to record the corresponding multiplexed groups of signal bits upon said channels, a plurality of reproducing means corresponding to the plurality of recording means and the corresponding plurality of storage channels, the reproducing means reproducing the stored groups of signal bits, and the recombining means comprising a plurality of video bit regenerator means connected with the reproducing means and connected with digital-to-analog converter means for reproducing the said first-named train of signals, the receiving means including a synchronizing signal separator for applying a synchronizing signal to the signal-transition distributor means and to the frame control means, the latter being energized by ready signal means when a desired picture is to be stored and displayed.

2. Apparatus as claimed in claim 1 and in which a synchronizing signal regenerator means is provided responsive to one of the reproducing means and connected to the said digital-to-analog converter means.

3. Apparatus as claimed in claim 2 and in which the said storage medium comprises rotatable magnetic means cooperative with the said pluralities of recording and reproducing means.

4. Apparatus as claimed in claim 3 and in which the said storage is effected by substantially saturation storage on the magnetic means.

References Cited

UNITED STATES PATENTS

| | | | |
|---|---|---|---|
| 2,889,541 | 6/1959 | Huss et al. | 340—174.1 |
| 3,262,104 | 7/1966 | Clynes. | |
| 2,874,214 | 2/1959 | Anderson | 340—174.1 |

ROBERT L. GRIFFIN, Primary Examiner

D. E. STOUT, Assistant Examiner

U.S. Cl. X.R.

179—15; 340—174.1